United States Patent
Stahl et al.

(10) Patent No.: US 7,865,196 B2
(45) Date of Patent: Jan. 4, 2011

(54) DEVICE, SYSTEM, AND METHOD OF COORDINATING WIRELESS CONNECTIONS

(75) Inventors: Michael Stahl, Jerusalem (IL); Shlomo Avital, Mate Yahuda Regional Council (IL)

(73) Assignee: Intel Corporation, Santa Clara, CA (US)

( * ) Notice: Subject to any disclaimer, the term of this patent is extended or adjusted under 35 U.S.C. 154(b) by 789 days.

(21) Appl. No.: 11/478,522

(22) Filed: Jun. 30, 2006
(Under 37 CFR 1.47)

(65) Prior Publication Data
US 2008/0002616 A1 Jan. 3, 2008

(51) Int. Cl.
H04W 72/00 (2009.01)
H04W 4/00 (2009.01)

(52) U.S. Cl. .................... 455/464; 455/426.1; 455/428; 455/41.2; 455/450; 370/329; 370/341; 370/328; 370/338

(58) Field of Classification Search .............. 455/426.1, 455/41.2, 450, 464; 370/338, 328, 329, 341, 370/348
See application file for complete search history.

(56) References Cited

U.S. PATENT DOCUMENTS

| 5,794,146 A * | 8/1998 | Sevcik et al. ................ 455/434 |
| 2003/0002456 A1* | 1/2003 | Soomro et al. .............. 370/328 |
| 2003/0171116 A1* | 9/2003 | Soomro ....................... 455/434 |
| 2004/0214539 A1* | 10/2004 | Rajamani et al. ......... 455/161.1 |
| 2004/0264413 A1* | 12/2004 | Kaidar et al. ............... 370/338 |
| 2005/0036469 A1* | 2/2005 | Wentink ..................... 370/465 |
| 2005/0063334 A1* | 3/2005 | Fnu et al. .................... 370/329 |
| 2005/0063416 A1* | 3/2005 | Shin et al. ................... 370/465 |
| 2006/0025128 A1* | 2/2006 | Lee .......................... 455/432.1 |
| 2006/0062235 A1* | 3/2006 | Ginzburg .................... 370/431 |
| 2006/0079232 A1* | 4/2006 | Omori et al. ................ 455/436 |
| 2006/0142034 A1* | 6/2006 | Wentink et al. ............. 455/515 |
| 2006/0159003 A1* | 7/2006 | Nanda et al. ................ 370/203 |
| 2006/0215622 A1* | 9/2006 | Abdel-Kader et al. ....... 370/338 |
| 2007/0060125 A1* | 3/2007 | Rahim ........................ 455/436 |
| 2007/0189249 A1* | 8/2007 | Gurevich et al. ............ 370/338 |

* cited by examiner

Primary Examiner—Huy Phan
(74) Attorney, Agent, or Firm—Pearl Cohen Zedek Latzer, LLP

(57) ABSTRACT

Embodiments of the present invention provide a method, apparatus and system for wireless stations periodically operating over a channel pre-designated for wireless stations to communicate and establish IBSS connections. Embodiments of the invention may provide a high probability that the stations may efficiently communicate. Additional features are described and claimed.

26 Claims, 3 Drawing Sheets

DEVICE, SYSTEM, AND METHOD OF COORDINATING WIRELESS CONNECTIONS

BACKGROUND OF THE INVENTION

A wireless station may connect to other stations in a wireless local area network (WLAN) at a point in time with either a basic service set (BSS) connection, via an access point (AP) connection, or may connect directly to another wireless station using an independent basic service set (IBSS) connection, referred to as an "Ad-Hoc" connection. The BSS connection may connect wireless stations to a central control device, for example, the AP. The IBSS connection has no central control and may directly connect a plurality of wireless stations, without an intermediary device.

A wireless station with a BSS connection may be connected or associated with an AP. Such a station may be referred to as an "associated wireless station". A wireless station without a BSS connection may not be associated with an AP. Such a station may be referred to as an "unassociated wireless station". A channel that is used for supporting a connection may be referred to as a "serving channel". Other channels may be referred to as "non-serving" channels. IEEE-Std 802.11, 1999 Edition (ISO/IEC 8802-11: 1999) standard or other standards may define a set of frequencies or channels that may be used for wireless connections. A wireless station may use different serving channels to support different connections. A wireless station may only maintain a connection when operating over the serving channel that supports the connection.

In order for a wireless station to establish a BSS connection, the wireless station may scan a plurality of channels, until the wireless station detects a serving channel used by an AP. A station may scan a sequence of channels, for example, incrementally, over a defined frequency range, for example, by transmitting or receiving information at each channel. Information necessary to establish a BSS connection between the wireless station and the AP may be supplied to the wireless station, in a plurality of out-of-band modes, for example, manually programmed into the station by a user.

In order for two or more wireless stations to establish an IBSS connection, one stationary wireless station may wait on one channel to meet another switching wireless station. The scanning wireless station may scan a plurality of channels to detect the channel where the stationary station is waiting. Since the scanning station has no prior knowledge about the meeting channel, this process may consume significant time. Furthermore, when two or more wireless stations concurrently search a plurality of channels, the stations may never meet.

A need exists for wider wireless connection capabilities for wireless stations.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
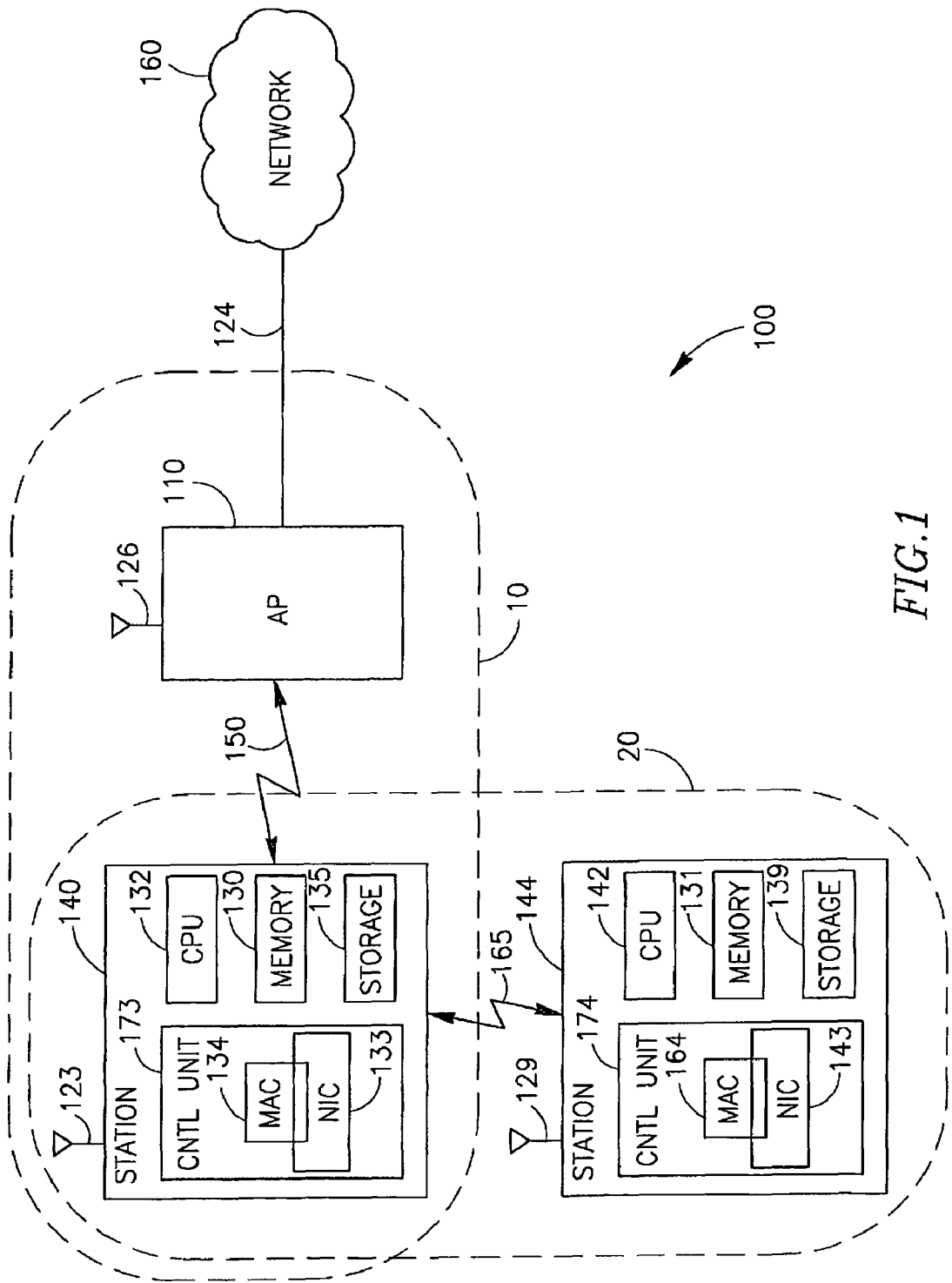
FIG. 1 is a schematic illustration of a wireless communication system including local area and personal area network elements according to a demonstrative embodiment of the present invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

It should be understood that the present invention may be used in a variety of applications. Although the present invention is not limited in this respect, the circuits and techniques disclosed herein may be used in many apparatuses such as personal computers, stations of a radio system, wireless communication system, digital communication system, satellite communication system, and the like.

Although specific system specification standards may be described, other types of WLAN communication systems intended to be within the scope of the present invention include, although are not limited to, "IEEE-Std 802.11, 1999 Edition (ISO/IEC 8802-11: 1999)" standard, and more particularly in "IEEE-Std 802.11b-1999 Supplement to 802.11-1999, Wireless LAN media access controller (MAC) and PHY specifications: Higher speed Physical Layer (PHY) extension in the 2.4 GHz frequency range", "IEEE-Std 802.11a-1999, Higher speed PHY extension in the 5 GHz frequency range" standard, "IEEE P802.11 Ma™/D6.0" draft standard, and the like.

Embodiments of the invention may be used in a variety of applications. Some embodiments of the invention may be used in conjunction with many apparatuses and systems, for example, wired or wireless stations including transmitters, receivers, transceivers, transmitter-receivers, wireless communication stations, wireless communication devices, wireless APs, modems, wireless modems, personal computers, desktop computers, mobile computers, laptop computers, notebook computers, personal digital assistant (PDA) devices, tablet computers, server computers, networks, wireless networks, local area networks (LANs), wireless WLANs, devices and/or networks operating in accordance with existing IEEE 802.11, 802.11a, 802.11b, 802.11e, 802.11g, 802.11h, 802.11i, 802.11n, 802.16 standards and/or future versions of the above standards, personal area networks (PAN), wireless PANs (WPANs), units and/or devices which are part of the above WLAN and/or PAN and/or WPAN networks, one way and/or two-way radio communication systems, cellular radio-telephone communication systems, cellular telephones, wireless telephones, personal communication systems (PCS) devices, PDA devices which may incorporate wireless communication devices, multiple input multiple output (MIMO) transceivers or devices, single input multiple output (SIMO) transceivers or devices, multiple input single output (MISO) transceivers or devices, multi receiver chain (MRC) transceivers or devices, transceivers or devices having "smart antenna" technology or multiple antenna technology, or the like. Some embodiments of the invention may be used in conjunction with one or more types of wireless communication signals and/or systems, for example, radio frequency (RF), infra red (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, multi-carrier modulation (MDM), or the like. Embodiments of the invention may be used in various other apparatuses, devices, systems and/or networks.

Although embodiments of the invention are not limited in this regard, the term "power save mode" as used herein may include, for example, an idle mode, a standby mode, a power conservation mode, reduced power mode, an efficiency mode, a "sleep" mode, a semi-operational mode, a semi-active mode, a partially-active mode, or other modes of operations in which a component, such as a transceiver or a sub-unit thereof, is not fully operational and/or active.

Reference is made to FIG. 1, which schematically illustrates a wireless communication system including local area and personal area network elements according to a demonstrative embodiment of the present invention. It will be appreciated by those skilled in the art that the simplified components schematically illustrated in FIG. 1 are intended for demonstration purposes only, and that other components may be required for operation of system 100. Those of skill in the art will further note that the connection between components in a wireless system need not necessarily be exactly as depicted in the schematic diagram.

System 100 may include two or more wireless stations (STAs) such as, for example, STA 140 and STA 144, and one or more APs 110. It will be appreciated that the network architecture described in system 100 may enable BSS connection 10 and IBSS connection 20 in accordance with embodiments of the present invention. STA 140 and STA 144 may establish IBSS connection 20 according to embodiments of the invention, as described in detail below. Additionally, STA 140 and/or STA 144 may establish a BSS connection 10 with one or more APs 110. System 100 may support BSS connections 10 and/or IBSS connections 20 over a BSS serving channel and an IBSS serving channel, respectively.

Although the present description relates to IBSS connection 20 or BSS connection 10 between two wireless stations, for example, between STA 140 and STA 144 or between STA 140 and AP 110, respectively, it will be appreciated by persons skilled in the art that the same configuration, with appropriate changes, may be implemented to enable such IBSS connections 20 or BSS connections 10 among more than two such wireless stations.

According to embodiments of the invention, as described below, STA 140 and STA 144 may meet on a channel, which may be pre-designated for STA 140 and STA 144 and/or additional wireless stations to communicate in order to establish IBSS connection 20. System 100 may enable a mechanism to coordinate the operations of STA 140 and STA 144 to efficiently meet on the pre-designated channel, for example, within a desired length of time, as explained in more detail below.

According to embodiments of the invention, a specific channel, referred to herein as a "parking channel", may be pre-designated for stations to communicate with other stations in order to establish IBSS connection 20. The parking channel may be pre-designated for STA 140 and STA 144 before the stations initiate communication or scan channels in order to establish IBSS connection 20 over the parking channel. By pre-designating the parking channel for STA 140 and STA 144 to communicate, STA 140 and STA 144 need only scan the parking channel to meet other stations with which to establish IBSS connection 20. Embodiments of the invention provide a system, device and method with a desired probability that STA 140 and STA 144 will meet and quickly communicate sufficient information for establishing IBSS connection 20, as explained in more detail below.

In some embodiments of the invention, the parking channel may be a fixed or permanent channel reserved for communicating in order to establish IBSS connection 20. In other embodiments of the invention the parking channel may vary in time, location and/or other parameters relating to the operation of BSS connection 10 or IBSS connection 20 and their supporting or associated network(s), for example, network 160. In one embodiment of the invention, STA 140 and STA 144 may be pre-programmed, for example, during the manufacturing of the wireless stations and/or installation of software in the stations, with data identifying the parking channel. In other embodiments, the parking channel may be pre-designated to STA 140 and STA 144 over one or more channels and/or networks.

According to some embodiments, scanning the parking channel may include two different scan modes, one active and one passive. In some embodiments of the invention, STA 140 may actively scan the parking channel, to initiate communication with STA 144, for example, by sending or transmitting signals such as probe requests, and waiting for a response signal. Additionally or alternately, STA 144 may passively scan the parking channel, and wait to receive an identifying signal such as, for example, a probe request, from another, active, station initiating the connection. If STA 144 receives the probe request on the parking channel, STA 144 may send a response signal, for example, an identifying signal such as a probe response on the parking channel. STA 140 may accept the probe response. Although STA 140 and/or STA 144 may both actively and passively scan, the following description is based on a non-limiting example wherein STA 140 actively scans and STA 144 passively scans. For example, STA 140 may send a probe request over the parking channel.

Identifying signals such as probe requests and probe responses may include information to be subsequently used for establishing IBSS connection 20 between STA 140 and STA 144, for example, capability information, supported data rates, etc., of STA 140 and/or STA 144. Identifying signals may contain additional information that may, for example, indicate whether or not STA 140 and/or STA 144 support mechanisms of embodiments of the invention. Identifying signals may also include additional information, for example, STA 140 and/or STA 144 network capabilities, STA 140 and/or STA 144 connection status including any current BSS connections 10 or IBSS connections 20, time intervals and channels for scanning, current scan interval start, for example, described in the last four bytes of the timing synchronization function (TSF), Internet protocol (IP) address, for example, which may be selected randomly from the 192.168.0.0 range, suggested service identifier set (SSID), security parameters or requirements, and information as specified in the IEEE 802.11 standard or any other standard being used.

Once sufficient information has been communicated between the stations, STA 140 and STA 144 may establish IBSS connection 20 over the IBSS serving channel using known methods, for example, according to the IEEE 802.11 standard or any other standard.

Based on the information communicated between the stations, STA 140 and STA 144 may coordinate their operations to operate over IBSS connection 20 on the IBSS serving channel during the same or sufficiently overlapping times. STA 140 and STA 144 may coordinate their operations by communicating connection parameters, for example, times and serving channels to operate over IBSS connection 20 and other connection parameters.

AP 110, STA 140 and STA 144 may include radio frequency antennas 126, 123 and 129, respectively. STA 140 and STA 144 may include control units 174 and 173, respectively. Control units 174 and 173 may include MACs 134 and 164, respectively, and wireless interface devices such as network interface cards (NICs) 133 and 143, respectively. STA 140 and STA 144 may include processors 132 and 142, memory units 130 and 131, and storage units 135 and 139, respectively.

In some embodiments, system 100 may include or may be a LAN, e.g., a WLAN in accordance with the IEEE-Std 802.11 group of standards as are known in the art. In some embodiments, system 100 may be, for example, a wireless network or a network that may include wireless STA 140 and/or STA 144 or components thereof. AP 110, STA 140 and STA 144 that are connected via BSS connection 10 or IBSS connection 20, may communicate via traffics 150 and 165, respectively, for example, over a shared access medium, e.g., using one or more wireless links as are known in the art. Although embodiments of the invention are not limited in this respect, traffics 150 and 165 may include packets or other collections of signals and/or data, such as, e.g., media access control service data units (MSDUs) that may make up a transmission of wireless signals, delivery traffic indication messages (DTIMs) informing clients of the next window for listening to broadcast and multicast messages, beacon frames, helping wireless stations identify nearby wireless access points, for example, sent periodically, with a period of a beacon interval, etc. In some embodiments, AP 110 may facilitate communication with a wider network 160 such as, for example, the Internet or an intranet, either wirelessly or via communication wires 124.

Although embodiments of the invention are not limited in this respect, radio frequency antennas 126, 123 and 129, may include or may be an internal and/or external RF antenna, for example, a dipole antenna, a monopole antenna, an omnidirectional antenna, an end-fed antenna, a circularly polarized antenna, a micro-strip antenna, a diversity antenna, or any other type of antenna suitable for transmitting and/or receiving wireless communication signals, blocks, frames, transmission streams, packets, messages and/or data. STA 140 and STA 144 may use antennas 123 and 129, respectively, to transmit and receive signals carrying information to be used for establishing IBSS connection 20 between STA 140 and STA 144, such as identifying signals.

In some embodiments, NIC 133 and/or 143 may provide functionality related to the data link layer of the seven-layer Open Systems Interconnection (OSI) reference model of network communications. Although embodiments of the invention are not limited in this respect, MAC 134 and MAC 164 may be included within NIC 133 and NIC 143, respectively, or MAC 134 and MAC 164 may be separate components in STA 140 and STA 144, respectively. For example, MAC 134 and MAC 164 may function as a device driver, as is known in the art, for NIC 133 and 143, respectively. In some embodiments, MAC 134 and MAC 164 may include an upper MAC layer and a lower MAC layer, as are known in the art. The lower MAC layer may, for example, be included within NIC 133 and 143, respectively. Control unit 174, for example, using MAC 134 and control unit 173, for example, using MAC 164, may periodically switch communication of STA 144 and STA 140, respectively, to the parking channel that has been pre-designated for communicating information to be used for establishing IBSS connection 20 between STA 144 and STA 140. In some embodiments, the timing of switching communication of STA 144 and STA 140 may be controlled by components, for example, internal timers, of control unit 174 and control unit 173, respectively.

Although embodiments of the invention are not limited in this respect, processor 132 and/or processor 142, may include, for example, a central processing unit (CPU), a digital signal processor (DSP), a microprocessor, a controller, a chip, a microchip, an integrated circuit (IC), or any other suitable multi-purpose or specific processor or controller. Memory units 130 and/or 131 may include, for example, a random access memory (RAM), a read only memory (ROM), a dynamic RAM (DRAM), a synchronous DRAM (SDRAM), a flash memory, a volatile memory, a non-volatile memory, a cache memory, a buffer, a short term memory unit, a long term memory unit, or other suitable memory units or storage units. Storage units 135 and 139 may include, for example, a hard disk drive, a floppy disk drive, a compact disk (CD) drive, a CD-ROM drive, or other suitable removable or non-removable storage units. In some embodiments, instructions may be recorded or stored, for example, in storage medium 135 and 139, and may be executed to perform a method in accordance with an embodiment of the invention.

According to embodiments of the present invention, STA 140 and/or STA 144, may maintain two or more connections during the same or sufficiently overlapping times, for example, BSS connection 10 with AP 110 and/or IBSS connection 20 with STA 144 or 140. STA 140 and/or STA 144 may operate BSS connection 10 over one channel, and may operate IBSS connection 20 over the same or another channel, for example, during different times.

In one embodiment of the invention, STA 140 and/or 144, associated with AP 110 may leave the BSS serving channel that supports BSS connection 10, without ending BSS connection 10, for example, by entering a "power-save mode" with the BSS as defined by the IEEE 802.11 standard or any other standard. While in power-save mode, associated STA 140 and/or 144 may operate over a channel other than the BSS serving channel, for example, the parking channel, for periodic intervals of time, without ending BSS connection 10 with AP 110. Before leaving the serving channel, associated STA 140 and/or 144 may send a signal to alert AP 110 that associated STA 140 and/or 144 may be temporarily unavailable over the serving channel. The signal may be, for example, a null data packet with a power save bit set. Upon returning to the serving channel, associated STA 140 and/or 144 may send a signal to alert AP 110 that associated STA 140 and/or 144 is available over the serving channel. The signal may be, for example, a null data packet. If associated STA 140 and/or 144 enter power-save mode before leaving the serving channel, AP 110 may not be alerted that associated STA 140 and/or 144 may be temporarily unavailable over the serving channel.

Wireless stations, e.g., AP 110, STA 140 and STA 144, may be equipped to operate according to one or more wireless communication standards. For example, AP 110, STA 140 and STA 144 may operate according to, e.g., the 802.11a, 802.11g and/or 802.11b standards. In one embodiment, the serving channels for different connections, for example, BSS connection 10 and IBSS connection 20 may be established over different frequency ranges. For example, AP 110, STA 140 and STA 144 may operate over BSS connection 10 using channels in the 5 GHz frequency range, and over IBSS connection 20 using channels in the 2.4 GHz frequency range, or vice versa.

Figure 2:
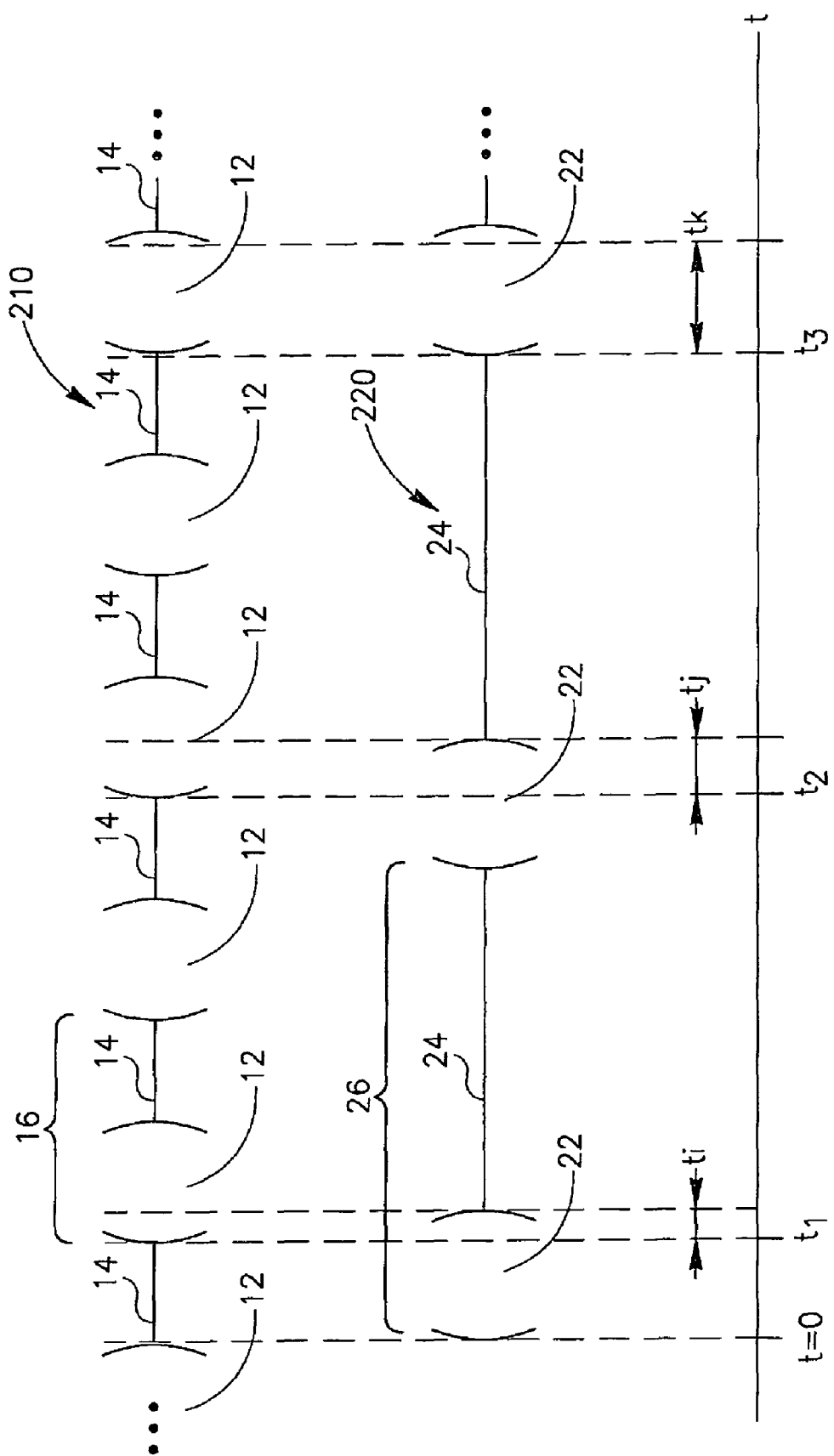
FIG. 2 is a schematic illustration of a timing diagram useful in describing the operations of an actively scanning station and a passively scanning station, respectively, according to a demonstrative embodiment of the invention.

Reference is made to FIG. 2, which schematically illustrates a timing diagram useful in describing the operations of an actively scanning station and a passively scanning station, respectively, according to demonstrative embodiments of the invention.

Embodiments of the invention may provide a system, apparatus and method for STAs 140 and 144 to communicate over the pre-designated parking channel in order to establish IBSS connection 20. STA 140 and STA 144 may switch channels according to switching schemes or time schemes. The operations of STAs 140 and 144 as discussed in reference to FIG. 2 are considered with respect to the pre-designated parking channel. Although the present description relates to STAs 140 and 144 meeting over one pre-designated parking channel in order to establish IBSS connection 20, it will be appreciated by persons skilled in the art that the same configuration, with appropriate changes, may be implemented to enable stations such as STAs 140 and 144 to meet over two or more pre-designated parking channels. For the purpose of explanation, the time at which STA 140 and STA 144 have both start scanning the parking channel may be normalized to t=0.

STAs 140 and 144 may scan the pre-designated parking channel for predefined intervals of time, for example, active scan intervals 12 and passive scan intervals 22, respectively. STAs 140 and 144 may periodically switch channels, alternating between the parking channel and one or more other non-parking channels, for example, non-serving or serving channels.

Strings 210 and 220 schematically illustrate time schemes of actively scanning STA 140 and passively scanning STA 144, respectively, periodically switching channels over time. Actively scanning STA 140 and passively scanning STA 144 may switch to the parking channel, during active scan intervals 12 and passive scan intervals 22, respectively. STA 140 and STA 144 may leave the parking channel to their respective non-parking channels during non-scan intervals 14 and 24, respectively. In one embodiment, STA 140 and/or 144 may periodically switch communication to the parking channel every scan cycles 16 and 26. Each periodic interval of time between when STA 140 and/or 144 switch communication to the parking channel may be referred to as a "switching period".

According to embodiments of the invention, STA 140 and STA 144 may both switch to the parking channel at times $t_1$, $t_2$, $t_3$, etc., to concurrently operate over the parking channel. Actively scanning STA 140 and passively scanning STA 144 may concurrently scan the parking channel, for example, during overlapping time intervals, $t_i$, $t_j$ and $t_k$. A pre-set time interval, $t_m$, may be defined as a minimal length of time necessary for STA 140 and STA 144 to communicate sufficient information over the parking channel to establish IBSS connection 20.

In one embodiment of the invention, when scan cycles 16 and 26 are significantly different, STA 140 may periodically switch to the parking channel for active scan intervals 12 that are shifted in time relative to passive scan intervals 22. Some overlapping time intervals, $t_k$, where $t_k$ is greater than or equal to $t_m$, are sufficiently lengthy for STA 140 and STA 144 to communicate sufficient information over the parking channel, as may be necessary to establish IBSS connection 20. Other overlapping time intervals, for example overlapping time intervals $t_i$ and $t_j$, where $t_i$ and $t_j$ are each less than $t_m$ may be individually too brief for STA 140 and STA 144 to communicate sufficient information over the parking channel to establish IBSS connection 20. In some embodiments, STA 140 and STA 144 may communicate sufficient information cumulatively over a number of overlapping time intervals, for example, during overlapping time intervals $t_i$ and $t_j$, where $t_i$ and $t_j$ are each less than $t_m$, but $t_i+t_j$ is greater than or equal to $t_m$.

Embodiments of the invention may provide time schemes to ensure that STAs 140 and 144 communicate sufficient information over the parking channel to establish IBSS connection 20 during one or a number of overlapping time intervals. In one embodiment of the invention, STA 140 and STA 144 may have different time schemes, for example, with different switching periods. For example, actively scanning STA 140 may have active scan intervals 12 that are different from passive scan intervals 22 of passively scanning STA 144. In another embodiment, non-scan intervals 14 between the time intervals when actively scanning STA 140 communicates over the parking channel may be sufficiently different from non-scan intervals 24 between the times when passively scanning STA 144 communicates over the parking channel. In some embodiments of the invention, active scan intervals 12 and passive scan intervals 22 may have a fixed initial duration, which may be increased or decreased incrementally, for example, by preset, fixed, time increments for every new scan cycle 16 and 26, respectively, until threshold durations for active scan intervals 12 and/or passive scan intervals 22 are reached. Once a threshold duration is reached, active scan intervals 12 and/or passive scan intervals 22 may be reset to the initial durations.

Periodically switching may include switching into and out of the parking channel according to fixed or variable time schemes. Each of scan cycles 16 and/or 26, non-scan intervals 14 and/or 24 between scanning the parking channel, and/or scan intervals 12 and/or 22, may have fixed or variable durations of time. Periodically switching need not imply switching according to fixed or repeating time schemes. Periodically switching may include switching using time schemes supported by embodiments of the invention, for example, variable time schemes. Time schemes or switching schemes may be fixed, repeating, variable or random. STA 140 and STA 144 may switch channels according to different time schemes, for example, which may result in STA 140 and/or STA 144 communicating information sufficient for establishing IBSS connection 20 within a desired length of time.

According to some embodiments of the invention, non-scan intervals 14 and 24 and/or scan intervals 12 and 22 may be selected so that there is a high probability that STA 140 and STA 144 may communicate sufficient information to establish IBSS connection 20 over the parking channel within a pre-set or desired length of time. In some embodiments, a user interface may be provided, for example, by STA 140 and/or STA 144, for a user to control or select time schemes or system 100 parameters that may guarantee sufficient communication between the stations within desired lengths of time.

For example, if non-scan intervals 14 are 509 mSec, non-scan intervals 24 are 500 mSec, active scan intervals 12 are 20 mSec, and passive scan intervals 22 are 50 mSec, then there is a high probability that STA 140 and 144 would require a time period shorter than 5 seconds to communicate sufficient information to establish IBSS connection 20. The duration of non-scan intervals 24 and 14 and the duration of scan intervals 22 and 12 may affect the length of time by which STA 140 and STA 144 may communicate sufficient information over the parking channel to establish IBSS connection 20.

In certain situations, when two stations concurrently both actively (or passively) scan the same parking channel, for example, during overlapping time intervals, the stations may fail to communicate. For example, when one actively scanning station sends a probe request it is not detected by another actively scanning station, since probe request may only be detected by passively scanning stations. To prevent such miscommunication, embodiments of the invention provide concurrent actively and passively scanning so that STAs 140 and 144 may both send and receive probe requests while operating over the parking channel. In one embodiment, STA 140 or 144 may have overlapping active scan intervals 22 and passive scan intervals 12. When STAs 140 and 144 scan the parking channel, one actively and one passively, during overlapping time intervals, the STAs 140 and 144 may communicate in order to establish IBSS connection 20 according to embodiments of the invention.

Associated STAs 140 and/or 144 with BSS connection 10 may switch out of and into BSS connection 10 serving channels according to the needs of the BSS. Associated STA 140 and/or 144 may alternate, for example, periodically, between a connection with the serving channel supporting BSS connection 10 and a connection with the parking channel. When associated STA 140 and/or 144 are required to communicate with the BSS, for example, to send a packet to AP 110, during active scan intervals 22 or passive scan intervals 12, STA 140 and/or 144 may disrupt active scanning or passive scanning, respectively, leave the parking channel, and return to the serving channel supporting BSS connection 10. In one embodiment, when traffic 150 over BSS connection 10 is large, associated STA 140 and/or 144 may remain on or return to the serving channel supporting BSS connection 10. For example, associated STA 140 and/or 144 may not leave the serving channel unless there is a duration of time (e.g., 50 mSec) during which no data is transmitted to or received from AP 110. In such embodiments, non-scan intervals 24 or 14 between scanning the parking channel may be adjusted. In one embodiment, a delivery traffic indication message (DTIM) may be reported to be delivered to associated STA 140 and/or 144 over the supporting serving channel during passive scan intervals 12 or active scan intervals 22, when STA 140 and/or 144 is scheduled to operate over the parking channel. In such situations, associated STA 140 and/or 144 may interrupt or adjust the passive scan intervals 12 or active scan intervals 22 so that STA 140 and/or 144 will be scheduled to operate over supporting serving channel when the DTIM or any beacon arrives. There may be a one-time or continual increase in non-scan intervals 24 or 14 between scanning the parking channel so that STA 140 and/or 144 may operate over the serving channel when the beacon or DTIM is reported to be delivered. For example, in some embodiments, new non-scan intervals between passively or actively scanning the parking channel may be equal to the non-scan intervals 24 or 14, respectively, plus half of a beacon interval. If the beacon interval is small (e.g., less than 100 mSec), a new passive scan time may be set to a fraction, for example half, of the beacon interval. In other embodiments, associated STA 140 and/or 144 may maintain a static time scheme and wait until active scan intervals 22 or passive scan intervals 12 are completed before returning to the BSS supporting serving channel.

According to embodiments of the invention, four separate cases may be considered.

In a first case, both STA 140 and STA 144 may be unassociated with AP 110. STA 140 and 144 may operate over one or more channels including the pre-designated parking channel to communicate with other stations with which to establish IBSS connection 20. STA 140 and 144 may scan the parking channel actively and/or passively according to the time schemes of embodiments of the invention. There may be overlapping time periods when one STA 140 or 144 actively scans and the other STA 140 or 144 passively scans the pre-designated parking channel. During such overlapping time periods, STAs 140 and 144 may communicate and possibly confirm information in order to establish IBSS connection 20 according to embodiments of the invention.

In a second case, one of STA 140 or 144 may be unassociated and the other STA 140 or 144 may be associated. Unassociated STA 140 or 144 may operate over one or more channels including the parking channel, for example, according to the embodiments of the first case above. Associated STA 140 or 144 may be associated with AP 110 and may maintain BSS connection 10 over a supporting serving channel. Associated STA 140 or 144 may switch into and out of the parking channel, alternating between the supporting serving channel, the parking channel, and possibly other channels. While operating over the parking channel, associated STA 140 or 144 may operate, for example, according to the embodiments with which the unassociated STAs 140 or 144 operate in the first case above.

In a third case, STAs 140 and 144 may both be associated with one or more APs 110, via one or more BSS connections 10, operating over the same or a different supporting serving channels. In this case, an associated STAs 140 and 144 may operate according to embodiments with which the associated STAs 140 or 144 operate in the second case above.

In a fourth case, there may be a pre-existing IBSS connection 20 over a supporting IBSS serving channel. Associated or unassociated STAs 140 and/or 144 may actively scan the IBSS serving channel to join the pre-existing IBSS connection 20. STA 140 and/or 144 may scan channels other than the parking channel during non-scan intervals 14 and 24 between scanning the parking channel, by sending probe requests over these channels. The network supporting IBSS connection 20 may receive one of the probe requests and send a probe response that may include, in addition to the information described above, information describing the pre-existing IBSS connection 20 and stations connected via IBSS connection 20. STA 140 and/or 144 and the stations supporting IBSS connection 20 may coordinate their scan intervals to operate over the pre-designated parking channel during substantially overlapping time intervals. Once STA 140 and/or 144 and the stations supporting IBSS connection 10 operate over the same pre-designated parking channel for substantially overlapping time intervals, they may communicate and establish IBSS connection 20 according embodiments of the invention by known methods, according to the IEEE 802.11 standard or any other standard.

Figure 3:
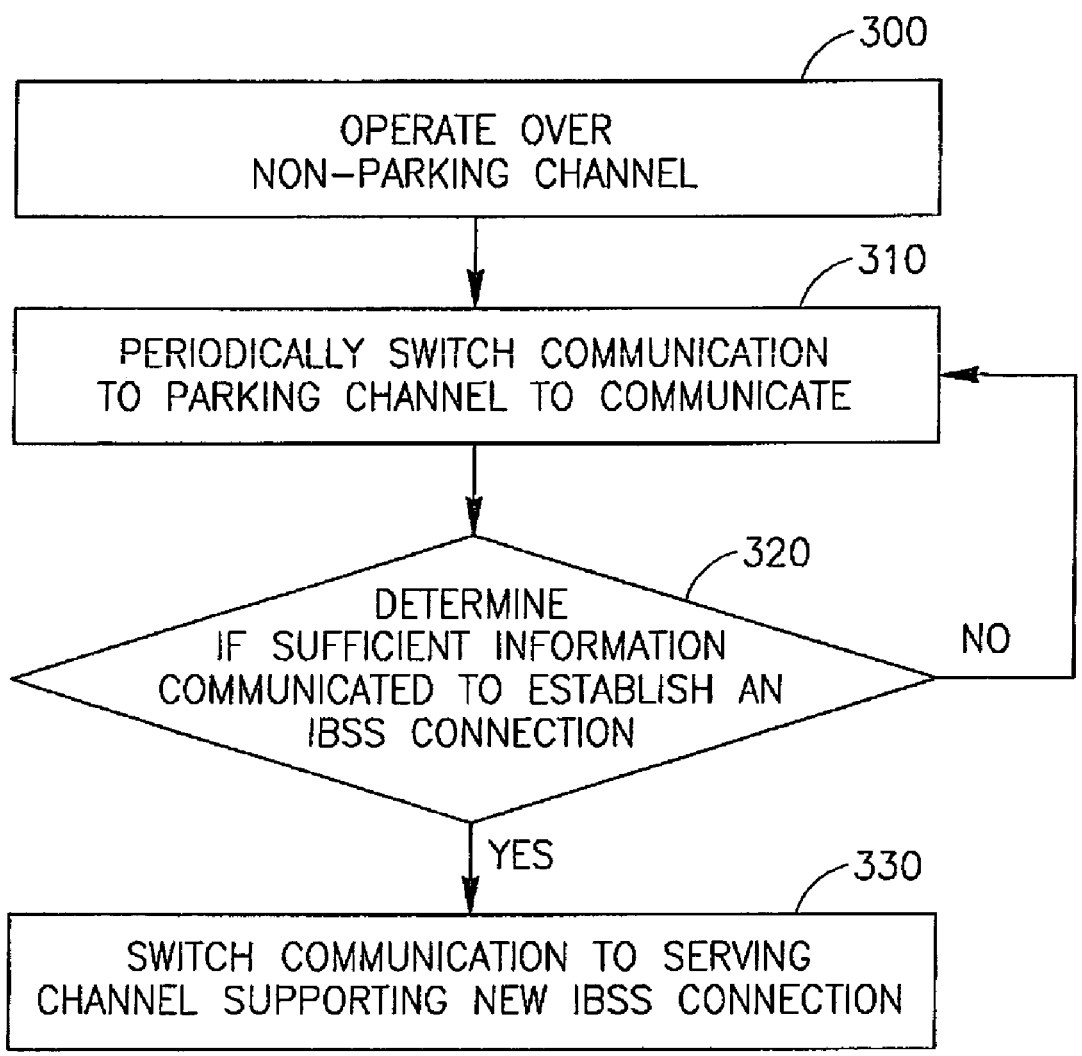
FIG. 3 is a flow chart of a method of coordinating operations of wireless stations for communicating information sufficient to establish an IBSS connection between the communicating wireless stations and/or other wireless stations according to a demonstrative embodiment of the invention.

Reference is made to FIG. 3, which is a flow chart of a method of coordinating operations of wireless stations for communicating information sufficient to establish an IBSS connection between the communicating wireless stations and/or other wireless stations according to a demonstrative embodiment of the invention.

In operation 300, one or more wireless stations, for example, STA 140 and/or STA 144, each with a control unit, for example, control unit 173 and 174, respectively, for switching channels, may operate over a non-parking channel, for example, for fixed or variable intervals of time measured by an internal timer. In one embodiment, one station may be an actively scanning station, for example, STA 140, and another station may be a passively scanning station, for example, STA 144.

In operation 310, controllers 173 and/or 174 may periodically switch communication of STAs 140 and 144, respectively, to a parking channel that has been pre-designated for communicating information to be used for establishing IBSS connection 20 between STAs 140 and 144. In one embodiment, controllers 173 and/or 174 may periodically switch communication of STAs 140 and 144, respectively, according to different switching schemes. Embodiments of the invention may substantially ensure that STAs 140 and 144 concurrently operate over the parking channel and communicate sufficient information over the parking channel, during one or more overlapping time intervals, to establish IBSS connection 20 between STAs 140 and 144, as described above in reference to FIG. 2.

STA 140 may communicate actively, for example, by sending identifying signals such as probe requests, and waiting for a response signal from STA 144. STA 144 may communicate passively and wait to receive an identifying signal from the actively scanning station. If STA 144 receives the identifying signal on the parking channel, STA 144 may send a response signal, for example, an identifying signal such as a probe response to STA 140 on the parking channel.

In operation 320, STA 140 and/or STA 144 may determine whether sufficient information has been communicated to establish IBSS connection 20 between STA 140 and STA 144. In one embodiment, passively scanning STA 144 may use the identifying signal sent from actively scanning STA 140 to determine if STA 140 and STA 144 will establish IBSS connection 20.

In operation 330, controllers 173 and/or 174 may switch communication of STAs 140 and 144, respectively, to a serving channel that may support new IBSS connection 20. STA 140 and STA 144 may establish and operate IBSS connection 20 over the serving channel. Once STA 140 and STA 144 establish IBSS connection 20, STA 140 and/or STA 144 may adjust their switching schemes to coordinate their operations.

In some embodiments, operation 330 may only be executed if sufficient information is communicated over the parking channel in order to establish IBSS connection 20 between STA 140 and STA 144. If sufficient information is not communicated in order to establish IBSS connection 20 between STA 140 and STA 144, operation 330 may be skipped and operation 310 may be repeated, for example, until IBSS connection 20 is established, as discussed above.

While the invention has been described with respect to a limited number of embodiments, it will be appreciated that many variations, modifications and other applications of the invention may be made. Embodiments of the present invention may include other apparatuses for performing the operations herein. Such apparatuses may integrate the elements discussed, or may comprise alternative components to carry out the same purpose. It will be appreciated by persons skilled in the art that the appended claims are intended to cover all such modifications and changes as fall within the true spirit of the invention.

What is claimed is:

1. A method comprising:
   at a first wireless station having associated therewith a pre-designated channel for establishing a communication connection between the first wireless station and a second wireless station before the stations initiate communication,
   operating the first wireless station over a channel that is not the pre-designated channel;
   periodically switching the first wireless station to scan the pre-designated channel to establish the communication connection between said first wireless station and the second wireless station, wherein the first wireless station makes a plurality of switches to the pre-designated channel and for each of the plurality of switches the first wireless station scans the pre-designated channel for a scan interval and then leaves the pre-designated channel to operate on another channel for a non-scan interval; and
   establishing the communication connection with the second wireless station over a serving channel by communicating with the second wireless station over the pre-designated channel within the scan intervals of the plurality of switches.

2. The method of claim 1, comprising:
   operating the second wireless station to make a plurality of switches to scan the pre-designated channel to establish the communication connection with the first wireless device, where for each of the plurality of switches the second wireless station scans the pre-designated channel for a scan interval and then leaves the pre-designated channel to operate on another channel for a non-scan interval; and
   communicating between said first and second wireless stations during one or more time intervals when both of said first and second wireless stations concurrently operate over the pre-designated channel.

3. The method of claim 1, wherein the communication connection between the first and second wireless station is an independent basic service set (IBSS) connection on an IBSS serving channel.

4. The method of claim 2, wherein periodically switching for at least one of the first or second wireless stations comprises switching according to a switching scheme for selecting scan and non-scan intervals that results in communicating sufficient information to establish the communication connection within a desired length of time.

5. The method of claim 2, wherein periodically switching for at least one of the first or second wireless stations comprises periodically switching to said pre-determined channel according to a preset, fixed, switching scheme.

6. The method of claim 2, comprising periodically switching said first wireless station according to a first switching scheme and periodically switching the second wireless station according to a second, different, switching scheme.

7. The method of claim 2, comprising periodically switching at one of said first or second wireless stations wherein the scan intervals for the first station are shifted in time relative to scan intervals of the second station.

8. The method of claim 1 wherein the second wireless terminal is an access point (AP) within a basic service set (BSS) network and the first wireless station and the AP establish a BSS connection on a BSS serving channel.

9. The method of claim 2 comprising actively scanning the pre-designated channel by the first wireless station to initiate communication with the second wireless station, which passively scans the pre-designated channel.

10. An apparatus comprising:
a memory; and
a controller:
to access a pre-designated communication channel for establishing a communication connection between a first device and a second device, where said communication channel has been pre-designated at the first device and at the second device before the first device initiates communication with the second device,
to operate the first device over a channel that is not the pre-designated channel, to periodically switch communication of the first device to the pre-designated channel to establish the communication connection between the first device and the second device, wherein the controller makes a plurality of switches to the pre-designated channel and for each of the plurality of switches the controller scans the pre-designated channel for a scan interval and causes the first device to leave the pre-designated channel and to operate on another channel for a non-scan interval, and
to establish the communication connection with the second device over a serving channel by communicating with the second device over the pre-designated channel within the scan intervals of the plurality of switches.

11. The apparatus of claim 10, wherein the second device comprises a controller operating to make a plurality of switches to scan the pre-designated channel, wherein for each of the plurality of switches the controller of the second device scans the pre-designated channel for a scan interval and then causes the second device to leave the pre-designated channel and to operate on another channel for a non-scan interval, and wherein both of the first and second devices operate concurrently over the pre-determined channel to communicate said information.

12. The apparatus of claim 10, wherein the communication connection between the first and second devices is an independent basic service set (IBSS) connection on an IBSS serving channel.

13. The apparatus of claim 10, wherein the controller is to periodically switch communication of the first device according to a switching scheme for selecting scan and non-scan intervals that results in communicating sufficient information to establish the communication connection with the second device within a desired length of time.

14. The apparatus of claim 10, wherein the second device is an access point (AP) within a basic service set (BSS) network and first device and the AP establish a BSS connection on a BSS serving channel.

15. The apparatus of claim 10, wherein the first device actively scans the pre-designated channel and initiates communication with the second device.

16. The apparatus of claim 10, wherein the first device passively scans the pre-designated channel to await communication by the second device.

17. The apparatus of claim 10, wherein the first device is programmed with data identifying the pre-designated channel.

18. A system comprising a first wireless station comprising:
a controller:
to access a pre-designated communication channel for establishing a communication connection between the first wireless station and a second wireless station, where said communication channel has been pre-designated at the first wireless station and at the second wireless station before the first wireless station initiates communication with the second wireless station,
to operate the first wireless station over a channel that is not the pre-designated channel,
to periodically switch the first wireless station to scan the pre-designated channel to establish the communication connection between the first wireless station and the second wireless station, wherein the controller makes a plurality of switches to the pre-designated channel and for each of the plurality of switches the controller scans the pre-designated channel for a scan interval and causes the first wireless station to leave the pre-designated channel and to operate on another channel for a non-scan interval, and
to establish the communication connection with the second wireless station over a serving channel by communicating with the second wireless station over the pre-designated channel within the scan intervals of the plurality of switches; and
an antenna to transmit and receive signals carrying said information.

19. The system of claim 18, wherein the second wireless station comprises a controller to periodically switch communication of the second wireless station to scan the pre-designated channel, wherein the controller operates to make a plurality of switches to scan the pre-designated channel, and wherein for each of the plurality of switches the controller of the second wireless station scans the pre-designated channel for a scan interval and then causes the second wireless station to leave the pre-designated channel and to operate on another channel for a non-scan interval, and wherein both of the first and second wireless stations operate concurrently over the pre-determined channel to communicate said information.

20. The system of claim 18, wherein the communication connection between the first and second wireless stations is an independent basic service set (IBSS) connection on an IBSS serving channel.

21. The system of claim 18, wherein the first wireless station is to periodically switch according to a switching scheme for selecting scan and non-scan intervals that results in communicating sufficient information to establish the communication connection with the second wireless station within a desired length of time.

22. The system of claim 18, wherein the second wireless station is an access point (AP) within a basic service set (BSS) network and first wireless station and the AP establish a BSS connection on a BSS serving channel.

23. The system of claim 18, wherein the first wireless station and the second wireless station are programmed with data identifying the pre-designated channel.

24. The system of claim 19,
wherein the first wireless station periodically switches according to a first switching scheme to set the scan and non-scan intervals for the first wireless station, and the second wireless station periodically switches according to a second, different, switching scheme to the set scan and non scan intervals for the second wireless station.

25. The system of claim 19, wherein the first wireless station performs periodically switching according to a shifting scheme where the scan intervals for the first wireless station are shifted in time relative to scan intervals of the second wireless station.

26. The system of claim 19, wherein the first wireless station actively scans the pre-designated channel, wherein the second wireless station passively scans the pre-designated channel, and wherein communication between the first and second wireless station is initiated by the first wireless station.

* * * * *